United States Patent
Jacquemin et al.

[11] 3,997,700
[45] Dec. 14, 1976

[54] FIREPROOF GLASSWORK

[75] Inventors: Francis Jacquemin, Monceau-sur-Sambre; Robert Terneu, Montignies-sur-Sambre; Jean-Pierre Voiturier, Gerpinnes, all of Belgium

[73] Assignee: Glaverbel-Mecaniver S.A., Watermael-Boitsfort, Belgium

[22] Filed: Mar. 28, 1974

[21] Appl. No.: 455,718

[30] Foreign Application Priority Data
Sept. 17, 1973 United Kingdom ............ 43537/73

[52] U.S. Cl. .............................. 428/332; 428/410; 428/426; 428/427; 428/432; 428/538; 428/913; 428/920; 106/15 FP

[51] Int. Cl.² ........................................ B32B 17/06

[58] Field of Search ............... 161/1, 41, 165, 190, 161/191, 192, 196, 199, 182, 215, 225, 403; 428/34, 142, 332, 426, 427, 428, 432, 920, 913; 106/15 FP; 252/3, 4, 5, 7

[56] References Cited
UNITED STATES PATENTS

| | | | |
|---|---|---|---|
| 3,006,783 | 10/1961 | Haaijman et al. | 161/192 |
| 3,341,399 | 9/1967 | Hazdra et al. | 161/199 |
| 3,640,837 | 2/1972 | Gaeth et al. | 428/332 |
| 3,793,105 | 2/1974 | Birchall et al. | 161/192 |

*Primary Examiner*—Harold Ansher
*Assistant Examiner*—William R. Dixon, Jr.
*Attorney, Agent, or Firm*—Cushman, Darby & Cushman

[57] ABSTRACT

The invention relates to a fire screening glazing panel and a method for forming the panel. The panel is composed of at least two structural plies, at least one of which is a vitreous sheet, and a layer therebetween composed at least in part of a heat convertible barrier forming material, which material forms a solid porous or cellular thermally insulating body when subjected to sufficient heat, as during a fire. The barrier forming material is an hydrated metal salt selected from the group consisting of aluminates, plumbates, stannates, alums, borates, and phosphates. The barrier forming material does not significantly reduce the transparency of the structural sheets, if they are transparent, even over extended use during normal conditions.

17 Claims, 3 Drawing Figures

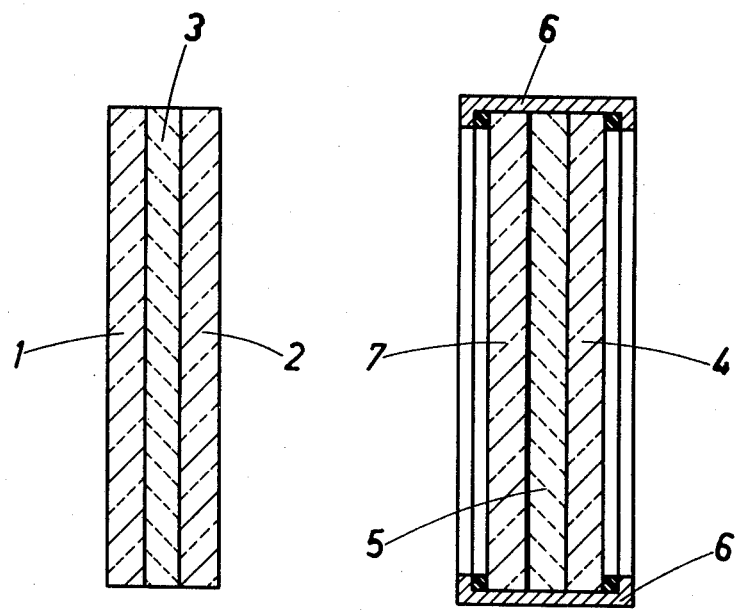
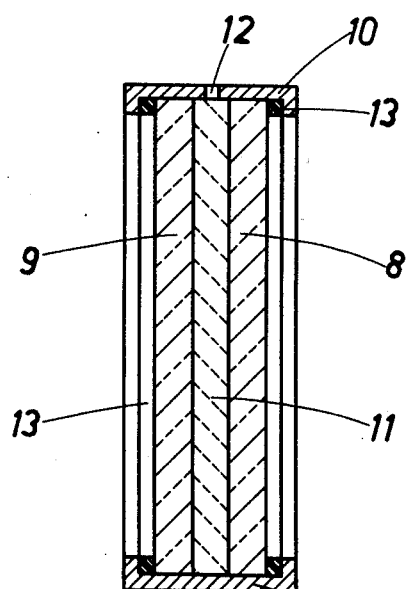

FIREPROOF GLASSWORK

This application is related to our copending application Ser. Nos. 455,717 and 455,719, which were filed on the same date as this application.

This invention relates to a fire-screening glazing panel comprising a fire screening means which becomes operative when sufficiently heated.

In the construction of buildings, glazing panels have sometimes to be used in exterior or interior walls or partitions. An obvious example is glazing panels comprising one or more sheets of glass or vitrocrystalline material used to form light-transmitting windows. Another example which is becoming increasingly important lies in the field of opaque glazing panels. Opaque glazing panels are often used, for example, to form the lower part of a partition whose upper part is transparent, especially where it is desired that the surface texture or some other property of the panels forming the upper and lower parts of the partition be similar.

Structural components occasionally must satisfy stringent standards of fire resistance. Fire resistance is sometimes quantified against a standard test in which the structural component is exposed to a specified temperature cycle over a certain period of time. The fire resistance potential of the component depends on the length of time for which the component can retain the strength required for it to fulfill its function. In certain circumstances fire resistance standards have to be complied with which require the component to have a minimum strength retention time, to be completely flame-proof, and to satisfy certain stringent tests of thermal insulating power to ensure that the component will prevent propagation of fire by heat radiation from the component and will not become so hot as to involve serious risk of burning a person who may touch the panel while it is exposed to the fire.

The standard of fire resistance of a given component can be quantified as a function of the time for which the component satisfies one or more of the specified criteria during a test in which the component is exposed to the interior of an enclosure in which the temperature is raised according to a predetermined schedule.

Ordinary panels comprising one or more sheets of glass are not highly thermally insulating or fire resistant. When exposed to fire, they become very hot so that they cannot be touched without causing personal injury. Moreover heat radiation from the heated panel itself constitutes a further fire hazard.

Various proposals have been made for dealing with this problem. One proposal is to install in a building having door and window openings, sprinkler heads for supplying a fire-extinguishing agent, e.g. water. The sprinkler heads are placed above each door and window opening of the building and communicate with a common reservoir containing the fire extinguishing agent along the doors and windows. When fire occurs, the sprinkler heads supply fire extinguishing agent. Such installations have certain disadvantages. Among those disadvantages is the fact that the installations are complicated and cannot be easily installed.

It is an object of the invention to provide a fire-screening glazing panel which can be easily and conveniently handled and installed. It is a further object to provide such a panel which has improved thermally insulating and fire-resisting properties. In particular the invention seeks to provide a glazing panel which, when subjected to rapid heating by a heat source disposed on one side of the panel, will remain in place to form an effective barrier against heat and against the passage of fumes or smoke which may be generated by a fire.

The present invention as broadly defined resides in a fire-screening glazing panel comprising a fire-screening means which becomes operative when sufficiently heated, characterized in that the panel comprises a first structural ply formed by a vitreous sheet and at least one other structural ply, and characterized in that between the said first structural ply and the other or another structural ply there is present at least one layer composed of or incorporating an hydrated metal salt selected from the following group: aluminates, plumbates, stannates, alums, borates and phosphates, which when sufficiently heated becomes converted to form a thermally insulating barrier.

The expression "vitreous material" as used herein comprises glass and vitrocrystalline material. Vitrocrystalline material is formed by subjecting a glass to a thermal treatment so as to induce the formation of one or more crystalline phases therein.

The invention affords a number of advantages which are considered to be important.

A first advantage is the fact that the fire-screening panel is very easy to install and is in itself sufficient to prevent or to delay the propagation of fire across an opening closed by the panel.

A second advantage is that even if one of the structural plies is broken by thermal shock generated by a fire, the panel can still be an effective barrier against the passage of smoke and fumes.

A third advantage is that such hydrated metal salts have only a very slight deleterious effect on a vitreous sheet to which they are applied as a heat convertible layer. The applicants have found that certain other hydrated metal salts, such as alkali metal silicates for example, which might be thought suitable for incorporation into a fire-screening panel, interact with vitreous sheets to a very marked extent. In particular, the vitreous sheet may suffer a loss in transparency or undergo a change in color. It is also possible under some circumstances to lose at least a part of the advantage gained in terms of thermal shock resistance of a chemically tempered vitreous sheet by interaction between the sheet and say sodium silicate. While it is recognized that such interaction may still occur using hydrated metal salts selected according to the teachings of the present invention, this interaction will under normal circumstances be very slight and may not become noticeable even during prolonged use.

When used as part of a light-transmitting panel, a layer of barrier forming material is convertible by heat to form a barrier which is of greatly reduced infra-red radiation transmitting power, as compared with the unconverted layer, or which is opaque. This feature allows the formation of very effective fire screens since the intensity of any infra-red radiation from a fire on one side of the panel which is transmitted through the panel may be reduced to a level at which it cannot, of itself, start a secondary fire on the other side of the panel.

Preferably, said heat convertible layer comprises an hydrated metal salt selected from the following group: aluminium salts and alkali metal salts. Examples of suitable hydrated metal salts are as follows:

| | | |
|---|---|---|
| Aluminates, | e.g. | Sodium or Potassium Aluminate |
| Plumbates, | e.g. | Sodium or Potassium Plumbate |
| Stannates, | e.g. | Sodium or Potassium Stannate |
| Alums, | e.g. | Sodium Aluminium Sulphate or Potassium Aluminium Sulphate |
| Borates, | e.g. | Sodium Borate |
| Phosphates, | e.g. | Sodium Orthophosphates, Potassium Orthophosphates and Aluminium Phosphate |

Such materials have very good properties for the purpose in view. They are in many cases capable of forming light-transmitting layers which adhere well to glass or vitrocrystalline material. On being sufficiently heated, the combined water boils and the layer(s) foams, so that the hydrated metal salt becomes converted into a form in which it is highly thermally insulating and remains adherent to the glass or vitrocrystalline material.

This feature is particularly important, since even if all the structural plies of the panel are cracked or broken by thermal shock, the panel may retain its effectiveness as a barrier against heat and fumes since the fragments of the plies may remain in position bonded together by the converted metal salt.

In the most preferred embodiments of the invention, the panel is a light-transmitting panel.

Advantageously, the barrier forming substance is convertible by heat to form a solid porous or cellular body which is opaque, since such bodies generally have low thermal conductivity.

In some embodiments, a layer of hydrated metal salt is used which is merely translucent (or which is in the form of a liquid layer), but preferably the barrier forming substance is a transparent solid at ambient temperature (20° C), since this avoids problems of sealing a liquid layer into the panel. Sodium Aluminium Sulphate and Aluminium Phosphate can form transparent layers.

Preferably the single or at least one of a plurality of vitreous plies of the panel is tempered. A tempered vitreous sheet is better able to withstand thermal shocks. Chemically tempered sheets are particularly recommended.

A panel according to the invention preferably comprises two structural plies, each constituted by a vitreous sheet and each providing an external face of the panel. Such a panel structure has the merit of simplicity. It is to be understood however that it is within the scope of the invention for the panel to incorporate more than two structural plies.

According to preferred embodiments of the invention, the panel is in the form of a laminate whose various plies are bonded together in face to face relationship, i.e. a structure in which said first vitreous sheet, at least one other structural ply, and the heat convertible layer(s) between such plies are bonded together.

The invention however also includes panels in which said first ply, another structural ply, and the heat convertible layer(s) intervening between such plies, are held together in register by extraneous means, e.g., by means of a frame, to define a multi-ply panel.

The invention also includes an article which comprises a multi-ply panel according to the invention as herein defined together with a second panel (comprising a single sheet or a plurality of sheets) held in spaced relationship to said multi-ply panel. Thus the invention can be embodied in a hollow glazing unit.

Preferably, at least one said layer of barrier forming material is between 0.1 and 8 mm in thickness. Layers having this range of thickness can be converted to become effective fire-screening barriers. It is clear that the effectiveness of a fire-screening barrier formed from a layer of given material will depend on its thickness, but also, the transparency of such a layer will be less with increased thickness. Preferably at least one layer of heat-convertible material has a thickness of between 0.1 and 3 mm, and optimally, the thickness of such a layer lies between 0.1 and 0.5 mm.

As previously stated, it is preferred that the panel is in the form of a laminate. The invention includes a method of forming such a laminate, which method comprises the steps of applying to one side of a vitreous structural ply a layer composed of or incorporating an hydrated metal salt selected from the following group: aluminates, plumbates, stannates, alums, borates, and phosphates, which when sufficiently heated becomes converted into a thermally insulating barrier, and bonding such layer to another structural ply. This is a very simple and effective way of forming a laminate-type panel according to the invention.

Preferably said hydrated metal salt is selected from the following group: aluminium salts and alkali metal salts, since such salts have particularly suitable properties.

In the preferred embodiments of the method according to the teachings of the present invention, the hydrated metal salt layer is applied as an aqueous solution which is dried before assembly of the panel. This is a very simple way of forming the heat convertible layer, and such a layer can bond itself to the vitreous sheet onto which it is applied during drying, without the need for any form of adhesive. The free water may be driven off, i.e. the layer dried, by blowing warm air across the sheet, e.g. by using a fan.

For example, in order to obtain a layer of hydrated aluminium phosphate, an aqueous solution containing 3.5 moles/liter of the salt is applied to a sheet, and subsequently dried. This solution may be obtained by mixing phosphoric acid and aluminium chloride in stoichiometric proportions.

In embodiments of the invention wherein each of the structural plies is a light-transmitting ply, it is preferred that the heat convertible layer is applied as a light-transmitting layer, so that the panel thus formed is itself light transmitting.

Preferably the heat convertible layer is applied to a thickness of between 0.1 and 8 mm, advantageously the heat convertible layer is applied to a thickness of between 0.1 and 3 mm, and optimally to a thickness of between 0.1 and 0.5 mm since layers having a thickness within these ranges can form very effective thermally insulating barriers after conversion.

Advantageously, the hydrated metal salt is caused to act as a bonding agent bonding the various plies of the panel together, since this is very convenient. In alternative embodiments however, the heat convertible layer is glued to the other structural ply, this also being a very convenient method of bonding the plies of the laminated panel together.

Panels according to the invention may be used to form, or form parts of, fire-proof doors or partitions in buildings, and for various other purposes.

The invention will now be further described by way of Examples with reference to the accompanying diagrammatic drawings in which FIGS. 1, 2 and 3 are cross-sectional views of three embodiments of fire screening glazing panel according to the invention.

EXAMPLE 1

A fire screening panel as shown in FIG. 1 was made comprising two sheets 1, 2 of soda-lime glass 4 mm thick and located between them a heat convertible layer of hydrated aluminum phosphate which, when subjected to heat formed a fire screening barrier.

The heat convertible layer 3 had a thickness of 0.5 mm and was applied as follows:

An aqueous solution of 3.5 moles of hydrated aluminum phosphate was obtained by mixing hydrated aluminum chloride ($AlCl_3 \cdot 6H_2O$) and phosphoric acid ($H_3PO_4$) in stoichiometric proportions. The solution prepared in this way was applied onto the upper face of the first glass sheet which had previously been laid substantially horizontal. The layer thus applied was then ventilated in a current of warm air in order to dry it. After the heat convertible layer 3 was dried the second glass sheet 2 was applied to the layer.

It has been found that a fire screening glazing panel made in this way has several advantages. It is very simple to position the panel in order to close an opening and there is no necessity for any other auxiliary installation. Furthermore the glazing panel constitutes an efficacious fire screening barrier. At the advent of fire the heat convertible layer 3 of hydrated aluminum phosphate becomes converted into a layer of anhydrous aluminum phosphate which is porous and opaque. This anhydrous layer is thicker than the heat convertible layer from which it derives and forms a screen against infra-red radiation. During the course of this conversion, the combined water of the hydrated aluminum phosphate is driven off and this contributes to a limitation in the rise in temperature of the side of the panel removed from the fire during the course of the conversion.

These phenomena allow the temperature of the face of the panel which is not directly subjected to the action of the fire to remain at an acceptable level.

Furthermore it has been found that on the advent of fire the layer of anhydrous aluminum phosphate thus formed constitutes a more refractory layer than does for example, sodium silicate, and also, the aluminum phosphate layer formed in this way binds itself more strongly to the adjacent sheet(s) of glass.

It has been found that the transparency of this glazing panel is conserved satisfactorily during the course of time particularly when it is compared with an otherwise identical panel comprising a layer of hydrated sodium silicate in place of the hydrated aluminum phosphate. Indeed it has been found that fire screening glazing panels comprising an hydrated sodium silicate layer lose their transparency fairly rapidly during the course of time and that blebs appear therein within a few months of manufacture. The glazing panel according to the present invention however, maintains its transparency for a much longer period.

As a variation, a fire screening glazing panel was made comprising a heat convertible layer 3 of hydrated sodium phosphate, but otherwise identical with the fire screening panel previously described in this Example. In another similar panel, the heat convertible layer 3 constituted hydrated potassium phosphate. It was found that these two modified panels according to the teachings of the present invention also had the advantages of being able to form an effective screening barrier, and maintaining their transparency for a considerable period before advent of fire.

EXAMPLE 2

A fire screening panel, as shown in FIG. 1 was made comprising sheets 1 and 2 of soda-lime glass each 4 mm thick and a heat convertible layer 3 of hydrated sodium borate 0.1 mm thick.

This hydrated sodium borate layer was obtained by laying the first sheet 1 of glass horizontal and applying to its upper face a solution of hydrated sodium borate. The solution thus poured on was allowed to spread out so that substantially the whole of the upper face of the sheet was covered with a layer of sodium borate solution of substantially uniform thickness and this was then dried by directing currents of warm air across it in order to drive off the unbound water, i.e. the water of solution.

After drying of the heat convertible layer, the panel was completed by placing the second sheet of glass 2 thereon and it was found that a panel made in this way had the same advantages as the three panels according to the invention described in Example 1. As a modification, the glass sheets 1 and 2 of this panel were chemically tempered before being assembled to form the panel. Such a chemical tempering treatment involves the exchange of potassium ions from a bath of potassium nitrate maintained at a temperature of 470° C in which the sheets were immersed.

The advantages of transparency maintaining and fire resistance of this modified panel were the same as the previously mentioned panels, but this modification has the particular advantage of strong resistance to breakage due to thermal shock which may be encountered during the first few minutes of a fire.

In another modification for use in a situation where there is only a very slight fire risk on one side of the partition, the sheet of glass to be directed to that side was replaced by a sheet of plastics material, and in a third modification the second sheet 2 of the panel was replaced by a laminated pane comprising two sheets of glass bonded together by an intervening layer of polyvinyl butyral. These two modifications were also able to maintain their transparency for a long period until the advent of fire when their heat convertible layers were converted to form an efficacious fire screening barrier.

EXAMPLE 3

FIG. 2 shows a further embodiment of the invention in diagrammatic cross-sectional view, in which a sheet of translucent vitrocrystalline material 4 was coated with a heat convertible layer 5 of hydrated potassium aluminum sulphate and clamped by means of a frame 6 against a second sheet 7 of vitrocrystalline material. The vitrocrystalline sheets 4 and 7 were each 6 mm thick and of known composition. The heat convertible layer 5 of hydrated potassium aluminum sulphate was formed 8 mm thick in the following manner: a solution of potassium aluminum sulphate in distilled water was prepared and heated to evaporate a part of the water of solution in order to obtain a viscous liquid which could be spread out easily on the vitreous sheets. This liquid was applied to the upper face of the vitrocrystalline sheet 4 which had first been laid horizontally and was then dried by blowing a current of hot air across it, using a fan.

After drying of the heat convertible layer 5, the sheet 4 bearing the layer 5 and the second vitrocrystalline sheet 7 were assembled, and were held together using the frame 6 of aluminum or aluminum alloy.

In order to stabilize the cellular structure of the heat convertible layer during conversion of the barrier forming hydrated material, polyvinyl pyrolidone may be added thereto before the layer is applied to a vitreous sheet. Preferably not more than 10% by weight of polyvinyl pyrolidone is so used. A material sold under the Trade Name "Bridolax" is also useful in this respect.

This glazing panel has excellent fire resistance properties.

This glazing panel, by virtue of the presence of translucent vitrocrystalline sheets, is itself translucent, and has the property of conserving its optical qualities during the course of time. It has been found that the translucidity of the panel remains unchanged over a prolonged period.

As a modification, an opaque fire screening glazing panel was made in which the vitreous sheets 4 and 7 were sheets of soda-lime glass bearing on one side a layer of enamel of classical composition including cobalt oxide. These enamel coatings were arranged towards the inside of the panel—that is adjacent the heat convertible layer 5—so that they were not in contact with the outside environment. The layer 5 was again of hydrated potassium aluminum sulphate and it was found that this modification also maintained its optical properties until the advent of fire, when it becomes an efficacious fire screening barrier.

So far, only those embodiments of the invention which are multi-ply panels have been described. It will be appreciated however, that the invention also includes panels in which said first ply and another structural ply are held together in spaced relationship by extraneous means, e.g. by means of a frame, to form a hollow panel unit.

EXAMPLE 4

In the embodiment shown in FIG. 3, the two sheets 8 and 9 of vitrocrystalline material were each 6 mm thick and transparent, and they were held assembled in spaced relationship in a frame 10. The space 11 between these two sheets was 8 mm across and was filled with a concentrated solution of sodium aluminum sulphate to constitute the layer of thermal barrier forming material. The sodium aluminum sulphate was introduced into the interior space 11 of the panel via a hole 12 in the frame 10 which was subsequently plugged to prevent leakage during transport and fitting of the panel.

The height of a panel having a liquid heat convertible layer preferably does not exceed 1 meter, so that the hydrostatic forces due to that layer may readily be withstood by the panel without taking special precautions.

Between the margins of the outer faces of the panel sheets 8 and 9, and the lips of the frame 10 engaging them, are located bodies of deformable sealing material 13, which may for example be formed of silicone rubber, and seal the interior of the panel against leakage, and also permit the panel to expand in thickness when the material in an interior space 11 is converted by heat to form a thermally insulating barrier.

EXAMPLE 5

A series of fire screening glazing panels were made as shown in FIG. 3.

These panels were similar to those described in Example 4, except that in each case the interior space 11 of the glazing panel was filled with a saturated aqueous solution of a different barrier forming material. These barrier forming materials were respectively:

| | |
|---|---|
| Sodium aluminate, | Potassium aluminate |
| Sodium plumbate, | Potassium plumbate |
| Sodium stannate, | Potassium stannate |

The fire screening glazing panels described in Examples 4 and 5 maintain their transparency during the course of time until the barrier forming material is converted at the advent of fire.

Although the invention has been herein shown and described in what is conceived to be the most practical and preferred embodiments, it is recognized that departures may be made therefrom within the scope of the invention which is not to be limited to details disclosed but is to be accorded the full scope of the claims so as to embrace any and all equivalent structures and methods.

What we claim is:
1. A fire screening glazing panel comprising
   a first structural ply formed by a vitreous sheet,
   a second structural ply formed by a vitreous or plastic sheet, and
   a layer formed between said plies comprising a material which is convertible to form a thermally insulating barrier of porous or cellular structure when said panel is subjected to sufficient heat, such as when said panel is subjected to a fire, said material being an hydrated metal salt selected from the group consisting of aluminates, plumbates, stannates, alums, borates, and phosphates.
2. A panel as recited in claim 1 wherein said barrier forming material is selected from the group consisting of aluminum salts and alkali metal salts.
3. A panel as recited in claim 2 wherein said panel is light transmitting.
4. A panel as recited in claim 1 wherein said panel is light transmitting.
5. A panel as recited in claim 4 wherein said barrier forming layer has a thickness of between 0.1 and 8 mm.
6. A panel as recited in claim 4 wherein said panel is a laminate whose various plies are bonded together in face-to-face relationship.
7. A panel as recited in claim 2 wherein said barrier forming layer is between 0.1 and 8 mm thick.
8. A panel as recited in claim 1 wherein said first ply of said panel has been tempered.
9. A panel as recited in claim 8 wherein said first ply of said panel has been chemically tempered.
10. A panel as recited in claim 1 wherein said barrier forming material layer is a transparent solid at 20° C.
11. A panel as recited in claim 1 wherein said panel is a laminate whose various plies are bonded together in face-to-face relationship.
12. A panel as recited in claim 1 wherein said barrier forming layer is between 0.1 and 8 mm thick.
13. A panel as recited in claim 12 wherein said barrier forming layer is between 0.1 and 3 mm thick.
14. A panel as recited in claim 13 wherein said barrier forming layer is between 0.1 and 0.5 mm thick.
15. A panel as recited in claim 1 wherein said hydrated metal salt acts as a bonding agent for bonding the plys that it engages together even after formation of said thermal insulating barrier.

16. A panel as recited in claim 1 wherein said first and second structural plies each provide an external face of said panel.

17. A panel as recited in claim 1 wherein said heat convertible barrier forming layer further comprises means for stabilizing the cellular or porous structure of the hydrated metal salt during thermal barrier formation, said stabilizing means comprising polyvinyl pyrolidone mixed with said hydrated metal salt and comprising no more than 10% of said layer.

* * * * *